J. R. SNYDER.
TRIPLE VALVE.
APPLICATION FILED MAR. 30, 1912.

1,094,942.

Patented Apr. 28, 1914.
3 SHEETS—SHEET 1.

WITNESSES

INVENTOR

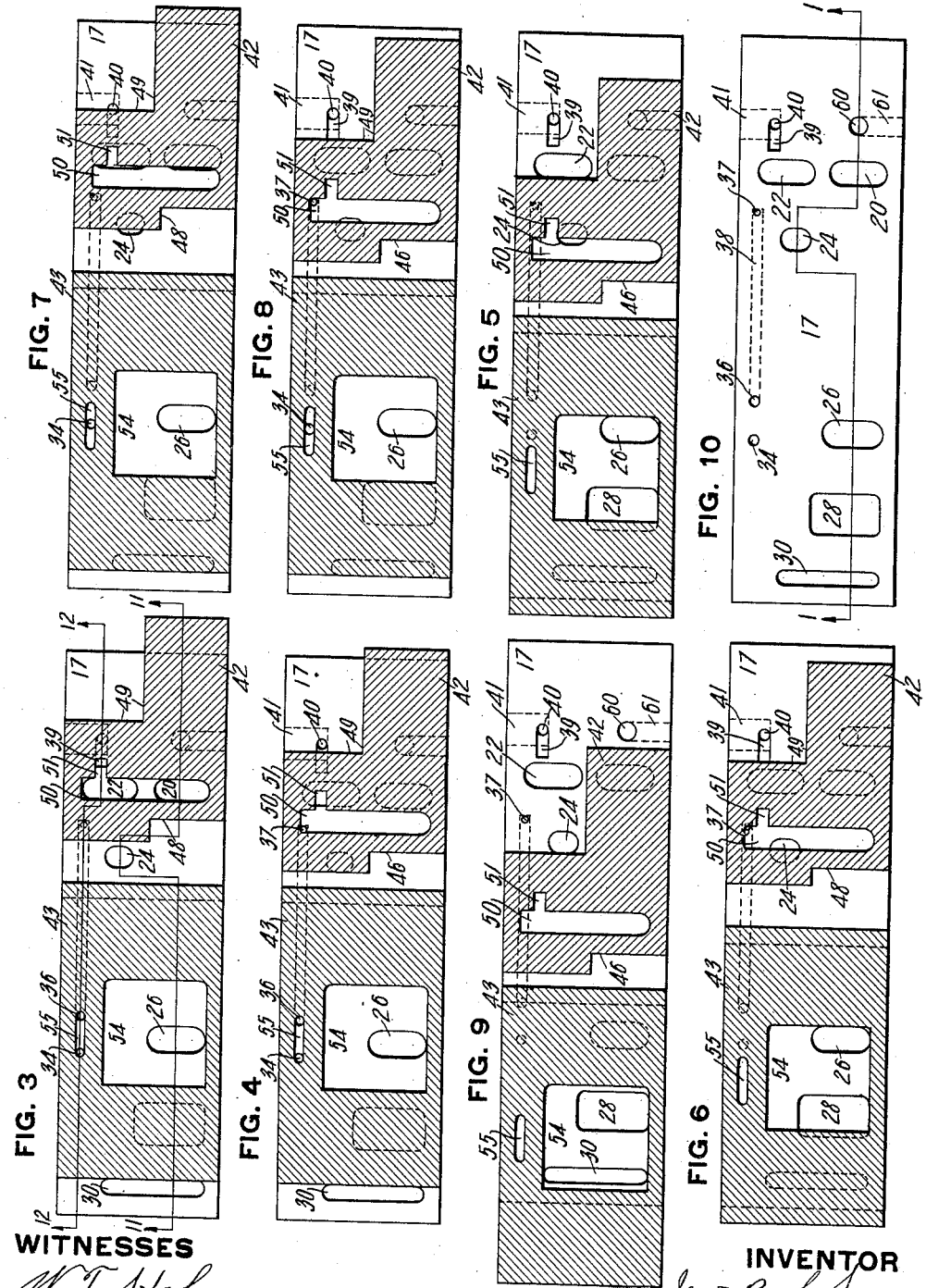

J. R. SNYDER.
TRIPLE VALVE.
APPLICATION FILED MAR. 30, 1912.

1,094,942.

Patented Apr. 28, 1914.
3 SHEETS—SHEET 3.

WITNESSES

INVENTOR

UNITED STATES PATENT OFFICE.

JACOB RUSH SNYDER, OF PITTSBURGH, PENNSYLVANIA, ASSIGNOR, BY MESNE ASSIGNMENTS, TO PITTSBURGH AIR BRAKE COMPANY, A CORPORATION OF PENNSYLVANIA.

TRIPLE VALVE.

1,094,942. Specification of Letters Patent. Patented Apr. 28, 1914.

Application filed March 30, 1912. Serial No. 687,534.

*To all whom it may concern:*

Be it known that I, JACOB RUSH SNYDER, a resident of Pittsburgh, in the county of Allegheny and State of Pennsylvania, have invented a new and useful Improvement in Triple Valves, of which the following is a specification.

This invention relates to triple valves for air brake systems, and particularly for use on locomotives.

The object of the invention is to provide a triple valve having the usual functions of triple valves, and also providing for a quick serial action of the brakes and for a graduated release of the brakes, and one especially adapted for double-heading purposes, and which performs these various functions by a much simpler and less complicated construction than prior valves for effecting the same results and functions.

The invention comprises the construction and arrangement of parts of a triple valve hereinafter described and claimed.

Figure 1:
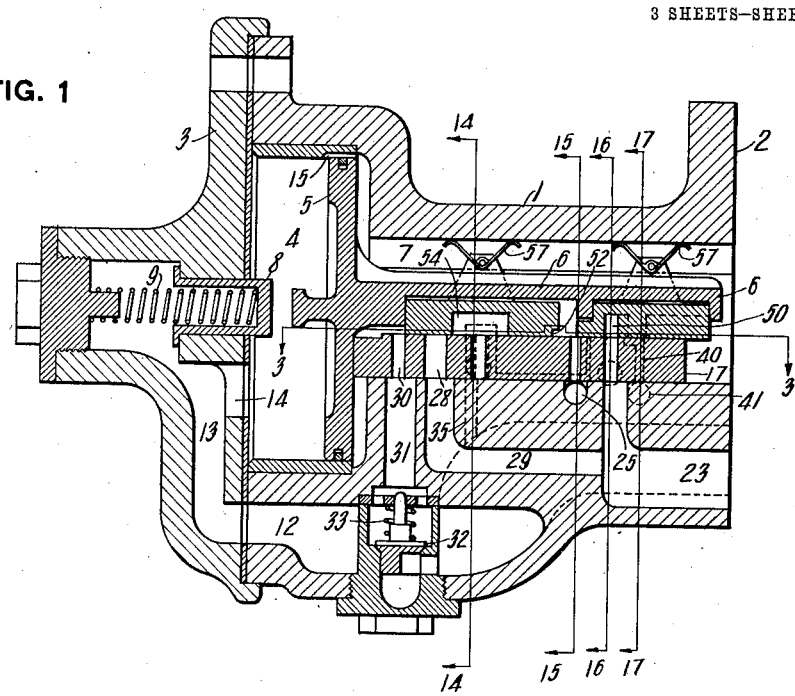
Figure 2:
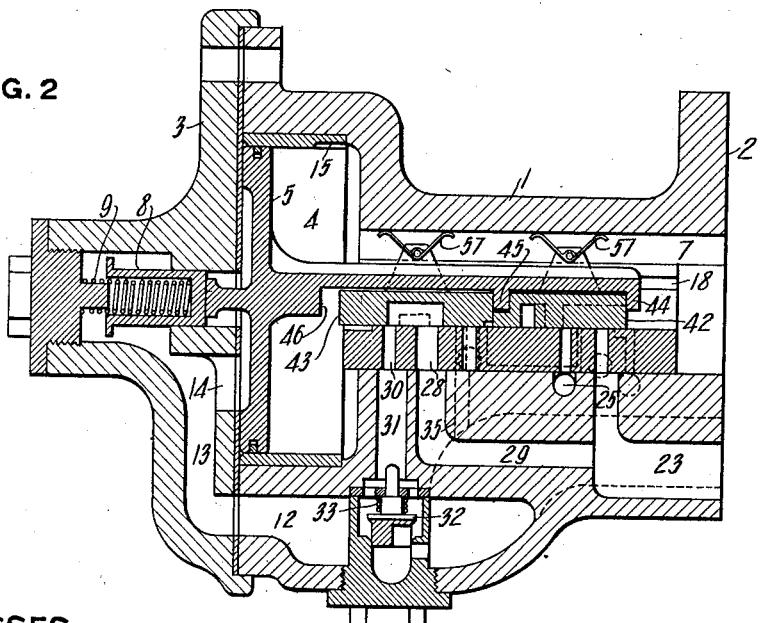
Figure 13:
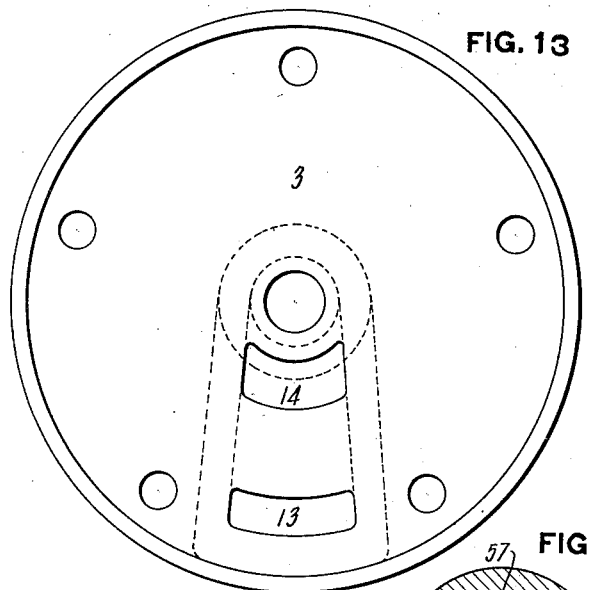
Figure 14:
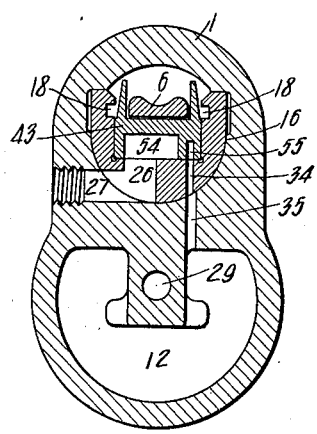
Figure 15:
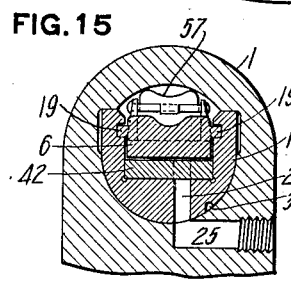
Figure 16:
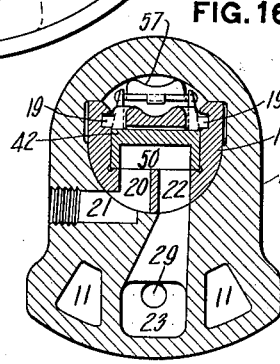
Figure 17:
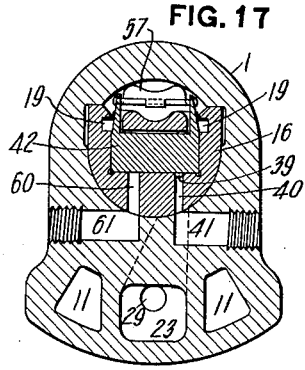
Figure 11:
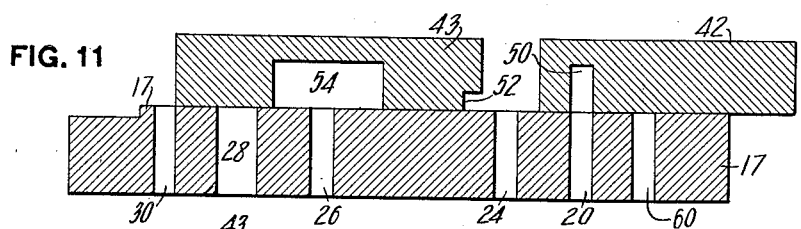
Figure 12:
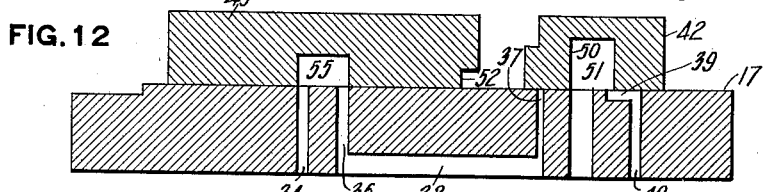

In the accompanying drawings Figures 1 and 2 are longitudinal sections through a triple valve embodying the invention, taken on the line 1—1, Fig. 10, Fig. 1 showing the same in full release and re-charging position, and Fig. 2 showing the same in emergency application position; Figs. 3, 4, 5, 6, 7, 8 and 9 are sectional plan views showing the valve seat and the slide valves in horizontal section on the line 3—3, Fig. 1, and showing different positions of the valve, Fig. 3 showing the same in full release position, Fig. 4 in quick service or quick serial application position, Fig. 5 in full service position, Fig. 6 in service lap position, Fig. 7 in graduated release position, Fig. 8 in graduated release lap position, and Fig. 9 in emergency position; Fig. 10 is a plan view of the valve seat; Fig. 11 is a vertical longitudinal section through the valve seat and valves in full release position on the line 11—11, Fig. 3; Fig. 12 is a similar view on the line 12—12, Fig. 3; Fig. 13 is an inside view of the head or cap of the valve casing; Fig. 14 is a vertical transverse section on the line 14—14, Fig. 1; Fig. 15 is a similar view on the line 15—15, Fig. 1; Fig. 16 is a similar view on the line 16—16, Fig. 1; and Fig. 17 is a similar view on the line 17—17, Fig. 1.

The valve in its general form, construction and arrangement follows the standard type of Westinghouse and similar valves. It comprises a casing 1 provided at one end with a flat face 2 for connection to the auxiliary reservoir and brake cylinder, and closed at its other end by means of the head or cap 3. In said casing is the usual chamber 4 in which works the piston 5 provided with a valve stem 6 extending into the bore 7 of the casing and actuating the slide valves. In the head or cap 3 is the usual graduating stem 8 held by graduating spring 9 and against which the main piston abuts, as is the usual practice in triple valves. The train or brake pipe connection is through two passages 11 extending longitudinally through the casing and meeting in a passage 12 from which a passage 13 leads through the cap or head 3 and communicates with the piston chamber 4 through port 14. In the bushing of piston chamber 4 is the usual charging groove 15 which is open when the valve is in full release position, and through which train pipe air passes the piston and thence through the bore 7 to the auxiliary reservoir which is connected directly with the end of bore 7. In the bore 7 is a suitable bushing 16 of general U-shape, as shown in Figs. 14, 15, 16 and 17 and having its lowermost portion 17 forming a valve seat. The inner sides of the bushing are provided with grooves 18 for receiving ribs 19 on the valve stem 6, thereby forming a guide for piston 5.

The seat 17 is provided with the ports and passages shown in Fig. 10, to wit, a port 20 communicating with a lateral port 21 leading to the atmosphere and forming the exhaust for the valve; a port 22 communicating directly with the central passage 23 which communicates with the brake cylinder; a port 24, which communicates with a lateral port 25 leading to a supplementary reservoir; a port 26 communicating with a lateral port 27 leading to the usual reducing valve; a port 28 communicating with the longitudinal passage 29 which opens into the brake cylinder connection 23; a port 30 communicating with the vertical passage 31 which communicates with the train pipe passage 12, but in which connection there is a check valve 32 normally held seated against train pipe pressure by spring 33; a small port 34 communicating with passage 35 leading to the train pipe passage 12; two small vertical ports 36 and 37 which are connected by the horizontal passage 38, and a recess 39 leading to a port 40 communicating with a lateral port 41 which has connection to a double heading control valve.

Coöperating with the valve seat are two slide valves, to-wit, a relatively small slide valve 42 and a larger slide valve 43. The slide valve 42 is held between an end projection 44 and a central projection 45 on the stem 6 of the main piston, so that said valve 42 at all times moves with the piston 5. The larger valve 43 is held between the central projection 45 and a shoulder 46 on the main piston stem, but does not quite fill the space between said projections so that there is a certain amount of lost motion which permits the main piston to move at times without moving the valve 43.

The smaller slide valve 42 in plan view is of the form shown in Figs. 3 to 9, the same not being of rectangular form, but being on one end cut away for substantially half its width, as at 48, and on the diagonally opposite corner being cut away for substantially half its width and length, as at 49. Said valve on its lower surface is provided with a cavity 50 extending for a considerable distance widthwise but only a short distance lengthwise of said valve, said cavity near one end having a longitudinal extension 51.

The slide valve 43 is of substantially rectangular form, having its forward lower edge cut away, as at 52. It is provided on its lower face with a pair of cavities, to-wit, a large substantially square cavity 54, and near one side edge with a smaller narrow cavity 55 extending lengthwise of said slide valve. The slide valves are held to the seat by the usual springs 57.

The valve has seven positions, as follows
1. *Full release and re-charging position*, (shown in Figs. 1, 3, 11, 12, 14, 15, 16 and 17.)—In this position the main piston is moved over to its extreme forward stroke so as to uncover the feed groove 15. Train pipe air entering the valve through passages 11, passes by way of passages 12 and 13 and port 14 to piston chamber 4, thence through feed groove 15 to the longitudinal bore 7 of the valve and thence to the auxiliary reservoir, thereby charging the auxiliary reservoir until the pressure therein equalizes with the train pipe pressure. In this position also the port 24 in the valve seat is uncovered so that air also passes to the supplementary reservoir by way of transverse passage 25, charging said supplementary reservoir to the same pressure as the auxiliary reservoir. The port 30 in the valve seat is also uncovered by the large slide valve 43, as shown in Fig. 3, which allows train pipe pressure to escape past the check valve 32 and enter the triple valve chamber and flow thence to the auxiliary and supplementary reservoirs. The check valve 32 will remain open until the pressure in the auxiliary and supplementary reservoirs plus the tension of spring 33 equalizes with the train pipe pressure, when said check valve will close, and the further charging of the auxiliary and supplementary reservoirs takes place more slowly through the feed groove 15. The port 30 provides a means for the quick charging of the reservoirs on the car, as will be readily understood. In this position the brake cylinder port 22 is connected with the exhaust port 20 through the transverse cavity 50 in slide valve 42, thereby venting the brake cylinder to the atmosphere and releasing the brakes. The double-heading control valve port 40 is also connected to the exhaust through cavity 39 and extension 51 of cavity 50. All other ports in the valve seat are blanked in this position of the valve.

2. *Quick service position, or serial venting position*, (shown in Fig. 4.)—This position is assumed upon the first movement of the main piston, which results in moving the small slide valve 42 from the position shown in Fig. 3 to that shown in Fig. 4, but without moving the large slide valve 43, due to the lost motion connection between the main piston stem and said valve 43. In this position all of the ports and passages remain as before, except that the feed groove 15 is closed, the supplementary reservoir port 24 is also closed, thereby trapping the air in said supplementary reservoir, and a direct connection is made between the train pipe and the brake cylinder through the port 34, cavity 55 in the slide valve 43, port 36, passage 38 and port 37 in the valve seat, cavity 50 and extension 51 thereof in the slide valve 42 and the brake cylinder port 22. The effect is that the train pipe is momentarily vented into the brake cylinder which is of course at atmospheric pressure, thereby producing a drop in pressure in the train pipe in the car and securing a quicker serial action of the brakes throughout the length of the train. The effect is the same as though at each car the train pipe were momentarily vented to the atmosphere, to secure quicker reduction of train pipe pressure toward the rear of the train than would be possible if all of the air had to flow forwardly and out at the engineer's brake valve. Instead, however, of venting the train pipe at each car to the atmosphere it is vented into the empty brake cylinder, thereby producing a light setting of the brakes. The small slide valve 42 has also uncovered port 40 so that auxiliary reservoir pressure flows to the double heading control valve at the very beginning of movement of the triple valve. The double heading valve is so arranged that upon admission of pressure thereto, it closes communication between the main reservoir and the train pipe, so that the second engine, on which the engineer's valve is in running position, cannot pump off the brakes. The valve remains for a brief time in this position, due to the fact that the first movement of piston 5 moves only the small slide valve 42, but as soon as the slack between the piston stem 6 and larger slide valve 43 is taken up, a greater frictional resistance is encountered which momentarily checks the movement of the piston, thereby providing an appreciable time of venting the train pipe into the empty brake cylinder. The reduction of train pipe pressure caused thereby, however, produces a sufficient overbalancing of pressure on the opposite sides of the main piston to overcome the friction of both slide valves, and the valve almost immediately moves over to the next position now to be described.

3. *Full service position*, (shown in Fig. 5.)—In this position the small slide valve 42 has moved over sufficiently so that its cut-away portion 49 uncovers the brake cylinder port 22, thereby allowing auxiliary reservoir air to rush into the brake cylinder, the exhaust port 20 remaining blank, as in the previous position. The ports 34, 37 and 36 are likewise blanked, as is also the supplementary reservoir port 24 which, while it communicates with the cavity 50, is nevertheless blanked because said cavity does not extend through the slide valve. The large slide valve 43 is now moved over so that its cavity 54 connects the brake cylinder port 28 with the reducing valve port 26, thereby permitting all pressure in the brake cylinder in excess of that to which the reducing valve has been set to escape and prevent flattening the wheels. The small slide valve 42 also maintains port 40 uncovered so that the double heading valve remains in the condition of the prior position.

4. *Service lap position*, (shown in Fig. 6.)—This position is assumed by the valve on a slight recoil, such as occurs immediately after a service application, due to a momentary overbalancing of pressure on the train pipe side of the main piston. The large slide valve 43 remains stationary, due to the lost motion connection between itself and the main piston stem, but the small slide valve 42 is moved over sufficiently to blank the brake cylinder port 22, thereby cutting off further flow of air from the auxiliary reservoir to the brake cylinder. All other ports remain blank, except the port 40 leading to the double head control valve, so that the latter valve remains in the same condition as in service operation.

5. *Graduated release position*, (shown in Fig. 7.)—This position is assumed by the valve upon a slight increase of train pipe pressure after a service application, to move the valves partly over toward release position and slowly release the brakes. In this position the large slide valve 43 blanks the connection between the brake cylinder port 28 and the reducing valve port 26. The supplementary reservoir port 24 is also partly uncovered by slide valve 42—so that said reservoir replenishes the auxiliary reservoir to the degree of equalization with the increased train pipe pressure. The important change in position, however, is that the cavity 50 in slide valve 42 partly uncovers brake cylinder port 22 and exhaust port 20, thereby permitting the slow venting of the brake cylinder to the atmosphere. This position of the valve remains only momentarily, as the slight recoil which always occurs after movement of the valve moves the same back to blank the connection between the brake cylinder port 22 and exhaust port 20, and by again producing a slight increase in train pipe pressure the valve can be repeatedly moved to the position shown in Fig. 7 and the brakes graduated off. Port 40 to the double heading control valve is still slightly open, so that said valve remains in the condition of the service positions.

6. *Graduated release lap position*, (shown in Fig. 8.)—This is the position assumed by the slight recoil above referred to or by the slight increase of auxiliary pressure over train pipe pressure, due to the high pressure from the supplementary reservoir flowing into the auxiliary reservoir by way of port 24 when the valve is in graduated release position, shown in Fig. 7. The large slide valve 43 has remained stationary, but the small slide valve 42 has been moved sufficiently to blank the connection between the brake cylinder port 22 and the exhaust port 20, and also to blank the supplementary reservoir port 24, while the port 40 to the double heading control valve is fully open.

7. *Emergency position*, (shown in Figs. 2 and 9.)—This position is assumed by the valve upon a large reduction in train pipe pressure, which causes the main piston 5 to compress the graduating spring 9 and move fully over to its left hand position, thereby dragging with it both of the slide valves. In this position the exhaust port 20 is of course blanked. Both the brake cylinder port 22 and the supplementary reservoir port 24 are fully uncovered and consequently the brake cylinder is supplied with air both from the auxiliary reservoir and from the supplementary reservoir. The port 40 to the double heading control valve is also fully open so that said valve is in the same condition as in the second position. The large slide valve 43 has also been moved over until its cavity 54 connects the brake cylinder port with the train pipe port 30, so that train pipe air passes check valve 32 and rushes to the brake cylinder, which flow of air will continue until the brake cylinder pressure plus the tension of spring 33 overbalances the train pipe pressure. Consequently in the emergency application of the brakes, the brake cylinder is supplied with air from the train pipe during the early part of the application thereby securing a quick serial action of the brakes throughout the train by reduction of train pipe pressure at each car, but as soon as the brake cylinder pressure overcomes the train pipe pressure the check valve 32 closes and thereafter the application is completed by the equalization of both auxiliary reservoir and supplementary reservoir pressure in the brake cylinder. Also in this position of valve 43 port 26 to the reducing valve is blanked. In emergency position the valve 42 has also uncovered port 60 which communicates with the lateral port 61 from whence connection is made to a valve arranged when fluid pressure is admitted thereto, to cut off the supply of steam to the engine cylinders, so that in this position of the valve not only are the brakes applied, but the steam is also cut off from the engine, so that the engineer need not give attention to the throttle valve but is left free to perform such other duties as are required in emergency applications. This feature is of special value when the valve goes to emergency position by reason of a bursting hose or the like, as it acts automatically to cut off the steam and, therefore, assists in stopping the train and also prevents the engine from tearing from the train. The emergency position of the valve can be secured either directly from the full release position, or from many of the other positions of the valve, by merely reducing the train pipe pressure below the point of equalization of auxiliary reservoir pressure with the brake cylinder.

The valve described has all of the usual functions of triple valves, including a quick service or serial venting position to secure the rapid serial action of the brakes throughout the train, and also securing a graduated release of the brakes, in addition to the usual service application and emergency application, as well as enabling the brakes to be held in any of the positions by lapping the valve. It also provides, in all positions except full release position, means for actuating a valve for cutting off the main reservoir from the train pipe on the second engine of a double header (where the brake valve is in running position), said valve being actuated by auxiliary reservoir pressure and prevents the second engine from pumping off the brakes which have been set by the first engine. The valve, therefore, performs all of the functions of the most approved engine triple valves, but by a mechanical construction much simpler and less complicated than existing valves which perform all of the functions of this valve, so that the valve not only is cheaper in first cost, but is more reliable in action, less liable to get out of repair, and offers much less resistance to movement than similar valves for securing the same functional effects.

The double heading feature herein described and shown may be embodied in valve having an emergency as well as a service brake cylinder, as described and claimed in my application filed March 21, 1912 Ser. No. 685,235; or it may be embodied in a valve having provision for maintaining or replenishing the brake cylinder pressure when the valve is in service application position, as described and claimed in my application filed March 21, 1912 Ser. No. 685,236. The connections of the valve illustrated and described herein to other parts of the system, are illustrated and described in my application filed April 10, 1912, Serial No. 689,753.

What I claim is:

1. A triple valve having connections to the train pipe, brake cylinder, auxiliary reservoir, atmosphere, and to a double heading control valve, said connection to the double heading control valve being independent of the brake cylinder connection, and ports and valve mechanism arranged in application position to open communication from the auxiliary reservoir to the brake cylinder and to the double heading control valve.

2. A triple valve having connections to the train pipe, brake cylinder, auxiliary reservoir, atmosphere, and to a double heading control valve, said connection to the double heading control valve being independent of the brake cylinder connection, and ports and valve mechanism arranged in application position to open communication from the auxiliary reservoir to the brake cylinder and to the double heading control valve, and in running position to connect the brake cylinder and the double heading control valve to the atmosphere.

3. A triple valve having connections to the train pipe, brake cylinder, auxiliary reservoir, atmosphere, and to a double heading control valve, and ports and valve mechanism arranged in all application and service lap and graduated release positions to open communication from the auxiliary reservoir to the brake cylinder and to the double heading control valve.

4. A triple valve having connections to the train pipe, brake cylinder, auxiliary reservoir, atmosphere, and to a double heading control valve, and ports and valve mechanism arranged in running position to connect the brake cylinder and the double heading control valve to the atmosphere, and in all application, service lap and graduated release positions to connect the auxiliary reservoir to the brake cylinder and to the double heading control valve.

5. A triple valve having connections to the train pipe, brake cylinder, auxiliary reservoir, atmosphere and to a double heading control valve, said connection to the double heading control valve being independent of the brake cylinder connection, and ports and valve mechanism arranged on light reduction in train pipe pressure to open communication directly from the train pipe to the brake cylinder, and on application reduction in train pipe pressure to open communication from the auxiliary reservoir to the brake cylinder and to the double heading control valve.

6. A triple valve having connections to the train pipe, brake cylinder, auxiliary reservoir, atmosphere and to a double heading control valve, said connection to the double heading control valve being independent of the brake cylinder connection, and ports and valve mechanism arranged on a service reduction in the train pipe pressure to first open communication from the auxiliary reservoir to the double heading control valve and from the train pipe to the brake cylinder and then break said last communication and open communication from the auxiliary reservoir to the brake cylinder.

7. A triple valve having connections to the train pipe, brake cylinder, auxiliary reservoir, atmosphere and to a double heading control valve, and ports and valve mechanism arranged on service reduction of train pipe pressure to first open communication from the auxiliary reservoir to the double heading control valve, and then open communication from the auxiliary reservoir to the brake cylinder.

8. A triple valve having connections to the train pipe, brake cylinder, auxiliary reservoir, the atmosphere and to a double heading control valve, and ports and valve mechanism arranged on service reduction of train pipe pressure to first open communication from the auxiliary reservoir to the double heading control valve and then open communication from the auxiliary reservoir to the brake cylinder, and in running position to connect the brake cylinder and the double heading control valve to the atmosphere.

9. A triple valve comprising a casing having connection to the train pipe and auxiliary reservoir, a valve seat in said casing having ports communicating respectively with the brake cylinder, the atmosphere and a double heading control valve, and valve mechanism coöperating with said seat and provided with ports and passages arranged on service reduction of train pipe pressure to first connect the auxiliary reservoir to the double heading control valve port and then connect the auxiliary reservoir to the brake cylinder.

10. A triple valve comprising a casing having connection to the train pipe and auxiliary reservoir, a valve seat in said casing having ports communicating respectively with the brake cylinder, the atmosphere and a double heading control valve, and valve mechanism coöperating with said seat and provided with ports and passages arranged in running position to connect the brake cylinder port and the double heading control valve port to the atmosphere.

11. A triple valve having connections to the train pipe, brake cylinder, atmosphere, auxiliary reservoir, a supplementary reservoir and to a double heading control valve, said connection to the double heading control valve being independent of the brake cylinder connection, and valve mechanism arranged on a large reduction of train pipe pressure to open communication from the auxiliary reservoir and also from the supplementary reservoir to the brake cylinder and to the double heading control valve.

12. A triple valve having connections to the train pipe, brake cylinder, atmosphere, auxiliary reservoir, a supplementary reservoir and to a double heading control valve, said connection to the double heading control valve being independent of the brake cylinder connection, and valve mechanism arranged on large reduction of train pipe pressure to open communication from the train pipe to the brake cylinder and also from the auxiliary and supplementary reservoirs to the brake cylinder and to the double heading control valve.

13. A triple valve having connections to the train pipe, brake cylinder, atmosphere auxiliary reservoir and to a double heading control valve, said connection to the double heading control valve being independent of the brake cylinder connection, and ports and valve mechanism arranged on a large reduction of train pipe pressure to open communication from the train pipe to the brake cylinder and from the auxiliary reservoir to the brake cylinder and to the double heading control valve, and a check valve in the connection between the train pipe and the brake cylinder and seating toward the train pipe.

14. A triple valve having connections to the atmosphere, train pipe, brake cylinder, auxiliary reservoir and to a double heading control valve, and ports and valve mechanism arranged on service application to open communication from the auxiliary reservoir to the double heading control valve, and on a slight increase of train pipe pressure after a service application to open a small connection from the brake cylinder to the atmosphere and maintain the connection from the auxiliary reservoir to the double heading control valve.

15. A triple valve having connections to the atmosphere, train pipe, brake cylinder, auxiliary reservoir, a supplementary reservoir and to a double heading control valve, and ports and valve mechanism arranged on service application to open communication from the auxiliary reservoir to the double heading control valve, and on a slight increase of train pipe pressure after a service application to open a small connection from the brake cylinder to the atmosphere and simultaneously open a communication from the supplementary reservoir to the auxiliary reservoir and thereby bring the valves to lap position, and meanwhile maintain the connection from the auxiliary reservoir to the double heading control valve.

16. A triple valve having connections to the atmosphere, train pipe, brake cylinder, auxiliary reservoir and to a double heading control valve, said connection to the double heading control valve being independent of the brake cylinder connection, and ports and valve mechanism arranged on reduction of train pipe pressure to connect the auxiliary reservoir to the brake cylinder and to the double heading control valve, and on a large increase of train pipe pressure to connect the brake cylinder and the double heading control valve to the atmosphere and the train pipe directly to the auxiliary reservoir through a check valve.

17. A triple valve having connections to the atmospheres, train pipe, brake cylinder, auxiliary reservoir, a supplementary reservoir, and a double heading control valve, said connection to the double heading control valve being independent of the brake cylinder connection, and ports and valve mechanism arranged on an excess of train pipe pressure over auxiliary reservoir pressure to charge both reservoirs and exhaust the brake cylinder and the double heading control valve, upon moderate reduction in train pipe pressure to connect the auxiliary reservoir with the brake cylinder and to the double heading control valve and trap the air in the supplementary reservoir, and upon emergency reduction of train pipe pressure to connect both the supplementary and the auxiliary reservoirs to the brake cylinder and to the double heading control valve.

18. A triple valve having connections to the atmosphere, train pipe, brake cylinder, auxiliary reservoir, a supplementary reservoir and a double heading control valve, and ports and valve mechanism arranged on large excess of train pipe pressure over auxiliary reservoir pressure to charge both the auxiliary and the supplementary reservoirs and exhaust the brake cylinder and the double heading control valve, upon moderate reduction of train pipe pressure to connect the auxiliary reservoir with the brake cylinder and the double heading control valve and close the connection from the supplementary reservoir, upon slight excess of train pipe pressure over auxiliary reservoir pressure to open a small communication from the brake cylinder to the atmosphere and simultaneously open a communication from the supplementary reservoir to the auxiliary reservoir while maintaining the connection from the auxiliary reservoir to the double heading control valve, and upon large reduction of train pipe pressure to connect both the supplementary reservoir and the auxiliary reservoir to the brake cylinder and to the double heading control valve.

19. A triple valve comprising a casing having connections to the train pipe and auxiliary reservoir, a seat in said casing having ports communicating respectively with the brake cylinder, the atmosphere and a steam cut-off valve, and valve mechanism coöperating with said seat and provided with ports and passages arranged in emergency position to open communication from the auxiliary reservoir to the brake cylinder port and also to the steam cut-off valve port.

20. A triple valve comprising a casing having connections to the train pipe and auxiliary reservoir, a valve seat in said casing provided with ports communicating respectively with the brake cylinder, the atmosphere, the train pipe connection and a steam cut-off valve, valve mechanism coöperating with said seat and provided with ports and passages arranged in emergency position to connect the train pipe port with the brake cylinder port, the auxiliary reservoir with the brake cylinder and the auxiliary reservoir with the steam cut-off valve port.

21. A triple valve comprising a casing having connections to the train pipe and auxiliary reservoir, a valve seat in said casing provided with ports communicating respectively with the brake cylinder, the atmosphere, the train pipe connection and a steam cut-off valve, a pair of valves coöperating with said seat and having movement relative to each other, one of said valves being arranged in emergency position to connect the train pipe port with the brake cylinder port, and the other valve being arranged in emergency position to connect the auxiliary reservoir with the steam cut-off valve port and also with the brake cylinder.

In testimony whereof, I have hereunto set my hand.

JACOB RUSH SNYDER.

Witnesses:
  F. W. WINTER,
  WILLIAM B. WHARTON.

---

Copies of this patent may be obtained for five cents each, by addressing the "Commissioner of Patents, Washington, D. C."